Oct. 16, 1951 — T. H. BONK — 2,571,823
COLLAPSIBLE OR FOLDING INFANT'S AUTO SEAT
Filed Aug. 16, 1948

Inventor
THEODORE H. BONK

Patented Oct. 16, 1951

2,571,823

UNITED STATES PATENT OFFICE 2,571,823

COLLAPSIBLE OR FOLDING INFANT'S AUTO SEAT

Theodore H. Bonk, Tampa, Fla.

Application August 16, 1948, Serial No. 44,427

3 Claims. (Cl. 155—10)

This invention relates to a child's collapsible carrier of the type designed for carrying a child in a safe manner in a vehicle, and more particularly to a child's collapsible carrier of the type described in application for patent, Serial No. 675,759, filed June 10, 1946, now Patent Number 2,461,367 issued February 8, 1949, and of which application this present application is a continuation-in-part.

The present invention embodies certain new and useful improvements over the invention disclosed in my aforementioned pending application for patent.

It is generally an object of the present invention to provide a child's collapsible carrier which may be either in the nature of a seat or in the nature of a crib, the device in either form being adapted to be secured to and carried by the conventional passenger seat of a passenger vehicle.

A specific object of the present invention is to provide an improved connection between the frame structure of the device and supporting hooks therefor.

A further object of the invention is to provide a simple and efficient pivotal connection between the horizontal frame and the back frame of the carrier.

Still another object of the invention is to provide an improved body support or seat for the carrier.

The child's carrier of the present invention possesses to a greater degree those desirable features of advantage enumerated in my co-pending application and the invention, together with the advantages thereof will be best understood by reading the following detailed description with reference to the accompanying drawing in which is illustrated a preferred embodiment of the invention, and wherein.

Figure 1:
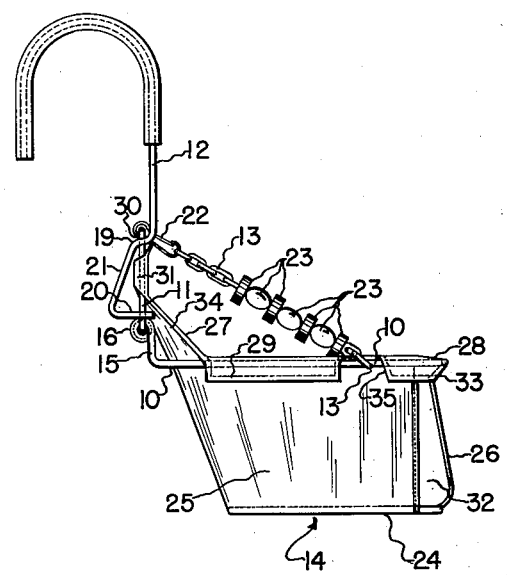
Figure 1 is a side elevational view of a child's carrier embodying the features of the present invention, the same being shown set up for use.
Figure 2:
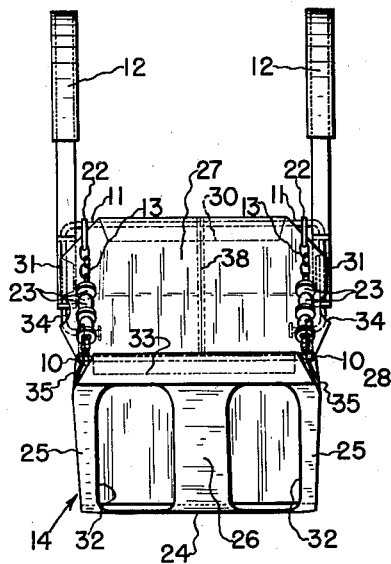
Figure 2 is a front elevational view thereof.
Figure 3:
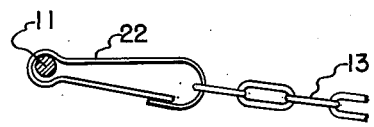
Figure 3 is a fragmentary detailed view showing the manner of adjustably connecting one end of the adjusting chains with the back frame member of the carrier.

The child's carrier of this invention, like to that disclosed in my aforementioned co-pending application, comprises essentially a frame structure including a horizontal frame 10, a back frame 11, supporting hooks 12—12, chains 13—13 for securing the frame 10 at the desired position of angular adjustment with respect to the back frame member 11 and a seat, indicated generally by the reference numeral 14, adapted to be mounted on the frames 10 and 11 and formed of canvas or other suitable material.

In accordance with the present invention the horizontal frame member 10 is substantially U-shaped with the bight or closed end of the frame arcuate as shown. The parallel side members of frame 10 terminate at their free ends in upwardly directed vertical extensions 15 that are formed with integral eyes 16. The back frame member 11 is also substantially U-shaped and the side or leg portions thereof terminate in lateral inwardly directed pintles 17 that are journaled in the eyes 16 to form pivotal connections between the frames 10 and 11. To provide for permanency of these pivotal connections there are mounted on the pintles 17 washers 18, and at their free ends the pintles 17 are peened or otherwise formed to retain the washers in position.

Also in accordance with this invention, the support hooks 12, which are formed from steel strip, have the shanks thereof, at the free ends of said shanks, formed to provide vertically spaced aligned apertured horizontal portions 19, 20, that are connected by an integral web 21 disposed at an angle to the perpendicular as shown. The legs or sides of the back frame 11 are journaled in the portions 19, 20 of the hooks 12 as shown whereby a simple and efficient swivel connection is provided between each hook 12 and the proximate leg or side of the back frame 11, as shown to advantage in Figure 4.

Figure 4:
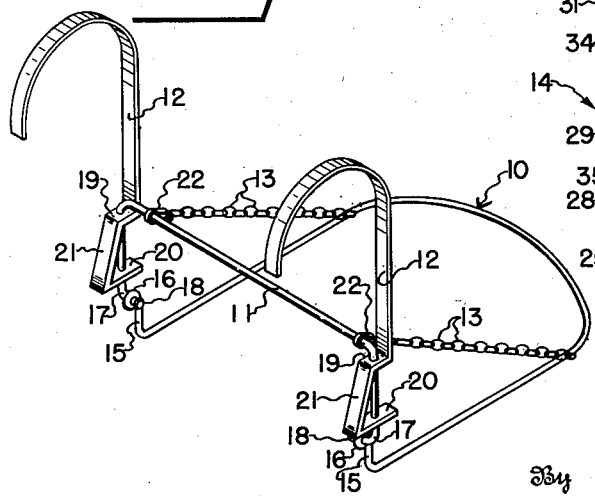
Figure 4 is a perspective view of the frame structure contemplated by this invention, said structure being shown in fully extended condition.

It will thus be seen that when the device is not in use the hooks 12 may be rotated from the position shown in Figure 4 to fold against the frames 10 and 11 when the carrier is in a fully collapsed condition for storage or similar purposes.

To retain the frame 10 in substantially horizontal position when the device is in use, and at the desired position as to height above the automobile seat proper, there are provided the aforementioned chains 13—13. As shown, these chains at one end are suitably secured to the sides of the frame 10 adjacent the front or closed end of that frame. For cooperation with the chains 13—13 there are provided snap fasteners 22, 22. These fasteners are of conventional, commercially available design and are mounted on the frame 11 as shown to be engaged, in a manner believed apparent, by selected links of the chains 13—13 to secure the frame 10 at the desired position of angular adjustment relative to the frame 11, and at the desired elevation with respect to the automobile seat.

Figure 5:
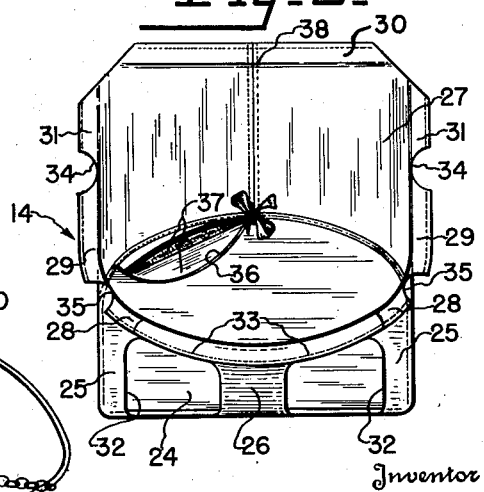
Figure 5 is a perspective view of the cloth body support or seat-forming part of the invention.

The cloth seat 14 of the device is shown to advantage in Figure 5. In forming the seat proper 24, integral sides 25 and integral back rest 27 a single sheet of suitable material is employed. In cutting the sheet to form the seat, the sheet is cut so that the same may be folded to bring two edges thereof together, and these edges are then stitched together for forming a seam 38 that extends along the longitudinal median of the back 27.

To complete the seat structure a second piece of cloth, cut into a substantial T is used and the tree 26 of the T is stitched at its free end to the front edge of the seat proper 24 to form with the sides 25 leg openings 32.

The first mentioned piece of cloth, forming the seat proper 24, sides 25 and back rest 27 is hemmed as at 28 and 29 to accommodate the frame 10 and at 30 and 31 to accommodate the frame 11 while the second, or T shaped piece of cloth, has the cross head thereof hemmed as at 33 to receive the front or closed end of the frame 10. Thus it will be seen that the seat may be readily attached to the mentioned frames in completing the entire assembly of the carrier.

It will be noted that the hems 29 and the hems 31 are separated by notched portions 34 to accommodate the pivotal connections between the frames 10 and 11, and that the hems 29 are separated from the hems 28 by notched portions 35 to accommodate the ends of the chains 13—13 secured to opposite sides of the frame 10.

Completing the structure of the cloth seat 14, an outer seat covering 36 of "leatherette," or other suitable long wearing material having an edge outline conforming substantially to the contour of the seat proper 24, is secured to the material of the seat proper along the front edge of said seat proper and inwardly from said edge adjacent the sides 25 to form for the seat 24 a pocket in which is placed a suitable pad 37. Preferably the pad 37 is made up of layers of material, the bottommost one of which may be of some suitable relatively stiff composition. The pad is releasably retained in the pocket, and the pocket held in substantially closed condition through the medium of suitable tie strings secured to the material of the seat 14 and the outer material 36 and tied into a bow adjacent the back of the seat as shown.

If desired, the seat assembly may be equipped with suitable ornaments 23. These ornaments as shown in Figure 1, may be associated either with the chains 13 or, if desired, the piece of material at the front of the seat and cooperating with the sides 25 to form the aforementioned leg openings 32 may be of uniform width throughout its length instead of being T-shaped, and these ornaments placed on the closed end of the frame 10 and extending through hem 33 to be available to the child at the front of the seat.

The manner of using the device in this invention will be apparent without further detailed description. It will also be observed that the child's support of this invention, although simply constructed, provides a very strong suspended seat which may be readily flipped open with one hand or folded back into a compact structure against the back of the auto seat when not in use; folds compactly so as to fit the glove compartment of many automobiles now in use; is of balanced design, is safe and by having the front of the frame 10 rounded affords sufficient elbow room for the operator of the vehicle so as not to interfere with his proper control of the vehicle.

While the invention has been described in detail in its presently preferred embodiment, it will, of course, be understood that such has been done for purposes of illustration only and not by way of limitation, and therefore only such limitations are to be imposed thereon as may reasonably come within the scope of the appended claims.

What I claim is:

1. A child's carrier comprising a cloth-supporting frame structure comprising back and horizontal frames pivoted together the back frame embodying a horizontal cross bar and vertical side members, supporting hooks for the frame structure, each supporting hook having a pair of horizontal and vertically spaced aligned apertured portions in which is journaled one side of the back frame member with the upper of said apertured portions engaging the horizontal cross bar of the back frame, chains secured at one end to opposed sides of the horizontal frame, and snap fasteners on the back frame and engageable with selected links of said chains for securing the horizontal frame member at selected positions of angular adjustment with respect to the back frame.

2. A portable child's carrier of the type designed for use in connection with the passenger seat of an automobile, comprising a horizontal frame having opposed side members provided at their free ends with eyes, and a back frame member having a horizontal cross bar and vertical side members terminating in lateral pintles journaled in said eyes to provide pivotal connections between said frames, and hooks for engagement over the back of the automobile passenger seat respectively each provided with vertically spaced horizontal portions provided with apertures accommodating the proximate vertical side member of the back frame with the upper of said horizontal portions engaging the horizontal cross bar of the back frame to provide a swivel connection between the hook and said frame member.

3. In a portable child's carrier of the type designed for use in connection with the passenger seat of an automobile, a back frame having a horizontal cross bar and vertical side members, and supporting hooks for the carrier, each of said supporting hooks having a shank provided at its free end with aligned horizontal and vertically spaced apertured portions connected by an integral web, said aligned apertured portions having a vertical side member of the back frame trained therethrough to provide a swivel connection between the hook and frame member, with the upper apertured portions engaging the horizontal cross bar of the back frame.

THEODORE H. BONK.

REFERENCES CITED

The following references are of record in the file of this patent:

UNITED STATES PATENTS

| Number | Name | Date |
|---|---|---|
| 264,157 | Hepburn | Sept. 12, 1882 |
| 802,537 | Uren | Oct. 24, 1905 |
| 1,659,405 | Love | Feb. 14, 1928 |
| 1,742,806 | Chaney | Jan. 7, 1930 |
| 2,005,463 | Harryman | June 18, 1935 |
| 2,031,109 | Kersten | Feb. 18, 1936 |
| 2,359,599 | Allen | Oct. 3, 1944 |